June 1, 1965  W. C. DUNLAP, JR  3,186,873
ENERGY CONVERTER
Filed Sept. 21, 1959

INVENTOR.
WILLIAM C. DUNLAP JR.
BY
*Richard J. Seeger*
ATTORNEY

# United States Patent Office 3,186,873
Patented June 1, 1965

3,186,873
ENERGY CONVERTER
William Crawford Dunlap, Jr., Cambridge, Mass., assignor to The Bendix Corporation, a corporation of Delaware
Filed Sept 21, 1959, Ser. No. 841,142
8 Claims. (Cl. 136—89)

This invention pertains to an energy converter, such as a photovoltaic battery, having increased efficiency.

It is an essential object of this invention to provide an energy converter, such as a photovoltaic battery, which has a plurality of n and p semiconductor layers joined in alternate relation with the semiconductor materials on either side of alternate junctions having high recombination rates so that the carriers crossing these junctions will be quickly recombined with carriers of the opposite sign to keep the voltage across these alternate junctions to a minimum. The semiconductor materials on either side of the remaining junctions have a low recombination rate so that the unidirectional voltage formed across the remaining junctions is high, and has minimum opposition from the aforementioned voltage established across the aforementioned alternate junctions. The semiconductor materials are chosen so as to have energy bands of decreasing magnitude to correspond with the energy bands of the source.

It is a further object to provide in such a battery alternate layers of p and n semiconductor materials which, through alloying of silicon, germanium, antimony, mercury, tellurium and other suitable materials, provide a gradually decreasing energy band gap which varies from the high to the low values of the radiation spectrum emanating from the energy source.

These and other objects will become more apparent upon the description of several preferred embodiments which are shown in the drawings, in which.

It has been an object for many years to provide a photovoltaic battery, such as a solar battery, which is capable of fully absorbing the various energy levels of an energy source, such as the sun's rays. One system is to place in series a multiplicity of separate batteries each having two layers of semiconductor material, with the batteries having different energy band gaps. The energy rays will enter and leave the first battery, which has a first absorption band gap, then enter and leave a second battery which has a second absorption band gap, etc. until the radiation energy spectrum was covered. However, due to the reflections and refractive losses between batteries, the efficiency of such a system, while higher than a single two layer battery system was still relatively low.

This invention improves on efficiencies previously obtainable by providing in a single battery a wide band energy absorption gap which can absorb solar or other energy with a very high efficiency.

Figure 1:
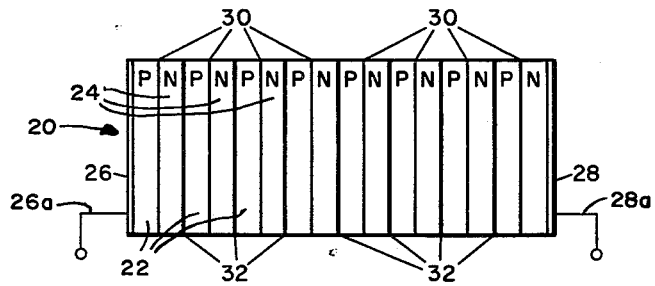
FIGURE 1 is an elevational view of a photovoltaic or solar battery of this invention.
Figure 2:
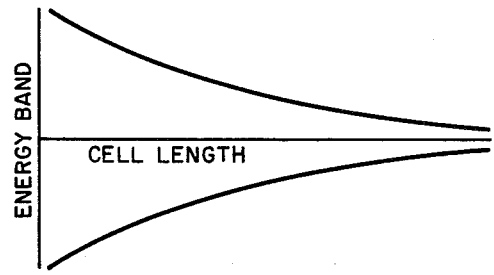
FIGURE 2 is a graph illustrating the gradually decreasing band gap provided by the battery of FIGURE 1.

In FIGURE 1 is shown an energy converter which may be used as a solar battery. The battery 20 has alternate layers or zones of a p (acceptor) material 22 and an n (donor) material 24 with an electrode 26 attached at one end and an electrode 28 attached at the other. The p and n materials may be made of crystalline semiconductor material having appropriate doping which is well known to the art. Battery 20 may be considered a wafer of semiconductor material having a first zone of one conductivity type, such as a layer of p material 22, and second zone of opposite conductivity type such as a layer of n material 24, a third zone of the one conductivity type such as a second layer of p material 22 etc. In other words, there is a zone of opposite conductivity type 24 between zones of a given conductivity type 22. The leads 26a and 28a are connected to electrodes 26 and 28 by means of ohmic contacts. The p-n junctions or rectifying barriers are surrounded by low recombination material, later defined, and are indicated by light lines 30 and the n-p junctions are surrounded by high recombination materials and are indicated by heavy lines 32. The p and n materials are chosen so that an energy band gap similar to that shown in FIGURE 2 is obtained. Radiation entering from the lefthand side of the converter 20 will first have its higher energy components absorbed and then its lower energy components will be absorbed in decreasing order.

In the embodiment shown, the semiconductor material in the layers at the left end of the solar battery 20 are composed of silicon and have an energy band gap of 1.2 electron volts. If desired, higher bands can be obtained by using such materials as aluminum phosphide, 3.0 electron volts; zinc selenium, 2.6 electron volts; cadmium selenium, 1.77 electron volts, or other known materials with desired band gaps.

To obtain lower band gaps in very small gradual steps, the silicon is preferably alloyed with a second, lower energy band gap semiconductor material, such as germanium, which has a band gap of 0.7 electron volt, with the amount of germanium in the alloy increasing as one moves rightwardly along the battery 20 until a proportion is reached wherein there is no silicon. At this point the energy band gap will be about 0.7 electron volt and to obtain lower band gaps the germanium may be alloyed with increasing amounts of a still lower energy band gap material, such as indium antimony, which has a band gap of 0.1 electron volt until a proportion is reached in which there is no germanium. To obtain still lower band gaps, germanium is again used and is alloyed with a substance, such as mercury tellurium, which has a very small band gap of 0.01 electron volt.

By constructing a number of layers in this manner which have progressively lower valued band gaps, and which are joined in a manner later described, a fairly continuous, decreasing band gap curve such as is indicated in FIGURE 2 is provided. The more layers that are used, the smoother will be the band gap curve. Of course, the various components used in the alloyed proportions may be changed to provide different band gap proportions. Other materials than those mentioned may be used to establish the band gap values shown in FIGURE 2. The curve in FIGURE 2 preferably is exponential with the slope near the high energy end being greater than that near the central and low energy ends.

The layers of p and n materials in the battery 20 of FIGURE 1 are formed so that p-n junctions 30 are surrounded by regions of semiconductor material, in both the p and n layers, which have low carrier recombination rates, and the n-p junctions 32 are surrounded by regions of semiconductor material, in both the p and n layers, which have high recombination rates. In this manner, the voltages developed across p-n junctions 30 are high and the voltages developed across the n-p junctions are low, which is desirable since the n-p junction voltages are in a direction opposite to the p-n junctions and subtract therefrom. In order to provide the high recombination rates, the semiconductor materials adjacent the n-p junctions 32 may be injected with small amounts of nickel, iron, chromium, cobalt, manganese, copper or other transition elements.

Figure 3:
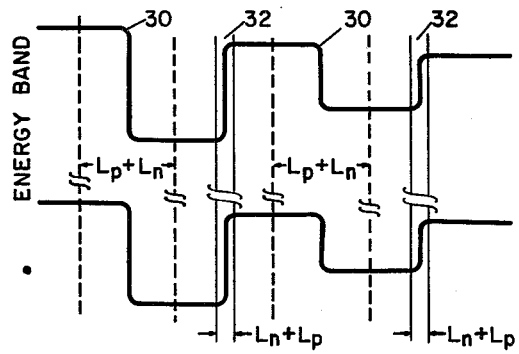
FIGURE 3 is a greatly enlarged, more detailed view of the band gap curve shown in FIGURE 2.

FIGURE 3 is an enlarged portion of the curve in FIGURE 2 and shows the above recombination rates. The ordinate in FIGURE 3 is the total electron energy while the abscissa is equal to diffusion length in the semiconductor material. There are a series of raised energy values which correspond to the p layers, and between these raised levels are a series of lower levels which correspond to the n layers in the battery or converter 20. The p-n junctions are represented by the energy barrier or sharply sloped line between each p and n energy level. The material surrounding the p-n barriers provide relatively long diffusion lengths $L_p$ and $L_n$ while the materials adjacent the n-p barriers or junctions 32 have a high recombination rate and very short diffusion lengths $L_n+L_p$. In a high recombination region the carriers, such as electrons or holes, quickly recombine with carriers of opposite sign so that the current flow in the direction opposite to that developed across the p-n junctions is minimized.

By placing alternate junctions in high recombination regions the counter voltages are lessened so that the additive forward voltages are substantially unopposed.

The method of forming the junctions between the layers of the p and n material may include growing junctions using either the single reservoir method wherein the doping is periodically changed, the multiple reservoir method wherein the crystal is switched from one doping melt to another, diffusing the junctions by vapor deposition process or other diffusing process, alloying the junctions, or combining growing, diffused and alloyed junctions. One particular method is to form a silicon wafer into which a p-n junction has been diffused and then deposit on the n type side of the wafer by vapor deposition a layer of p type germanium. The p type layer is reversed to n type by changing the impurity content of the gas stream that causes the vapor deposition. The junction between the silicon and germanium shows signs of disorder as a result of the misfit between the germanium and silicon lattices. Hence it is believed to be a region of high recombination and will suppress the counter E.M.F.'s established across the n-p junction.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. An energy converter comprising a stack of alternately arranged layers of p and n type semicodnuctor material, junctions being formed between each of said p layers and the nearest n layers on either side of the p layers, there being at least two of said junctions in said stack, the energy bands of said layers being of progressively decreasing values, low recombination rate materials being in the semiconductor materials on either side of alternate junctions to give long diffusion lengths to the carriers moving across the alternate junctions, high recombination rate materials being in the semiconductor materials on either side of the remaining junctions to keep diffusion lengths of carriers moving across the remaining junctions to a minimum so that the voltages established across said alternate junctions are additive and have minimum opposition from the voltages established across said remaining junctions.

2. An energy converter comprising a stack of alternately arranged layers of p and n type semiconductor material, junctions being formed between each of said p layers and the nearest n layers on either side of the p layers, there being at least two of said junctions in said stack, the energy bands of successive layers being of progressively decreasing values, low recombination rate materials being in the semiconductor materials on either side of alternate junctions to give long diffusion lengths to the carriers moving across the alternate junctions, high recombination rate materials being in the semiconductor materials on either side of the remaining junctions to keep diffusion lengths of carriers moving across the remaining junctions to a minimum so that the voltages established across said alternate junctions are additive and have minimum opposition from the voltages established across said remaining junctions.

3. The converter of claim 2 wherein said layers comprise materials of silicon, germanium and mixtures thereof.

4. The converter of claim 2 wherein said layers comprise materials of silicon, germanium and mixtures thereof, the semiconductor materials adjacent either side of said remaining junctions having injected therein small amounts of at least one of the transition elements.

5. The converter of claim 2 wherein said layers comprise materials and mixtures thereof taken from the group of aluminum phosphide, zinc selenium, cadmium selenium, silicon, germanium, indium antimony, and mercury tellurium.

6. The converter of claim 2 wherein at least one of said junctions is formed between a layer of silicon type semiconductor and germanium type semiconductor to provide a high recombination area of low opposing electromotive force.

7. An energy converter comprising a stack of alternately arranged layers of P and N type semiconductor material, junctions being formed between each of said P layers and the nearest N layers on either side of the P layers, there being at least two of said junctions in said stack, the energy bands of certain of said layers being different than the energy bands of other of said layers, means for imparting long carrier diffusion lengths to alternate junctions, means for imparting short carrier diffusion lengths to the remaining junctions, so that the voltage established across the alternate junctions are additive and have minimum opposition from the voltage established across the remaining junctions.

8. A photovoltaic cell comprising a crystalline semiconductor wafer including a first zone of given conductivity type, a second zone of opposite conductivity type, a third zone of given conductivity type, the energy gap of said second zone being between the energy gaps of said first and third zones, a first rectifying barrier between said first and second zones, a second rectifying barrier between said second and third zones, and an ohmic contact to at least two of said zones.

References Cited by the Examiner
UNITED STATES PATENTS

| 2,588,254 | 3/52 | Lark-Horovitz | 136—89 |
| 2,915,578 | 12/59 | Pensak | 136—89 |
| 2,919,299 | 12/59 | Paradise | 136—89 |
| 2,949,498 | 4/60 | Jackson | 136—89 |

WINSTON A. DOUGLAS, *Primary Examiner.*

JOHN R. SPECK, JOHN H. MACK, *Examiners.*